United States Patent
Haptonstahl

(10) Patent No.: US 12,321,858 B2
(45) Date of Patent: Jun. 3, 2025

(54) MULTIPLE DATA LABELING INTERFACES WITH A COMMON DATA INFRASTRUCTURE

(71) Applicant: Capital One Services, LLC, McLean, VA (US)

(72) Inventor: Stephen Haptonstahl, Herndon, VA (US)

(73) Assignee: Capital One Services, LLC, McLean, VA (US)

( * ) Notice: Subject to any disclaimer, the term of this patent is extended or adjusted under 35 U.S.C. 154(b) by 854 days.

(21) Appl. No.: 17/539,662

(22) Filed: Dec. 1, 2021

(65) Prior Publication Data

US 2023/0169328 A1   Jun. 1, 2023

(51) Int. Cl.
| | |
|---|---|
| G06F 7/00 | (2006.01) |
| G06F 16/25 | (2019.01) |
| G06F 16/28 | (2019.01) |
| G06F 18/2113 | (2023.01) |
| G06F 18/214 | (2023.01) |
| G06N 3/08 | (2023.01) |
| H04L 67/10 | (2022.01) |

(52) U.S. Cl.
CPC ............. *G06N 3/08* (2013.01); *G06F 16/254* (2019.01); *G06F 16/285* (2019.01); *G06F 18/2113* (2023.01); *G06F 18/214* (2023.01); *H04L 67/10* (2013.01)

(58) Field of Classification Search
CPC ....... G06N 3/08; G06F 16/285; G06F 16/288; G06F 16/254; G06F 18/2113; G06F 18/214; H04L 67/10

USPC .................................................. 707/600–899
See application file for complete search history.

(56) References Cited

U.S. PATENT DOCUMENTS

| | | |
|---|---|---|
| 9,497,203 B2 | 11/2016 | Honig et al. |
| 10,359,742 B2 | 7/2019 | Tong et al. |
| 2021/0374348 A1* | 12/2021 | Dasgupta ............... G06N 3/044 |

FOREIGN PATENT DOCUMENTS

WO   2021007514 A1   1/2021

OTHER PUBLICATIONS

2018. Aggregating Crowdsourced Labels in Subjective Domains. Proc. ACM Hum.-Comput. Interact. (Apr. 2018), 17 pages. https://doi.org/0000001.0000001.

Feb. 23, 2023—(WO) International Search Report and Written Opinion—PCT/US2022/051360.

(Continued)

*Primary Examiner* — Isaac M Woo
(74) *Attorney, Agent, or Firm* — Banner & Witcoff, Ltd.

(57) ABSTRACT

Systems as described herein may provide multiple data labeling interfaces with a common data infrastructure. An annotation system may retrieve data from a plurality of data sources and convert the data to a common schema. The annotation system may train a machine learning classifier to output a plurality of label suggestions, which may be sent to a plurality of data labeling tools. A plurality of labels may be received from the data labeling tools. The annotation system may accordingly export the plurality of labels and the converted data in the common schema to a label database.

20 Claims, 7 Drawing Sheets

(56) References Cited

OTHER PUBLICATIONS

Dae-Young Park et al. "Auto-Labeling of Sensor Data Using Social Media Messages a Case Study for a Smart City" Proceedings of the 36th Annual ACM Symposium on Applied Computing, ACMPUB27, New York, NY, USA, Mar. 22, 2021, pp. 752.-760, XP058560839, DOI: 10.1145/3412841.3441952.
Jie Jiu et al. "FLAME: A Self-Adaptive Auto Labeling System for Heterogeneous Mobile Processors" ARXIV.org, Cornell University Library, 201 Olin Library University Ithaca, NY 14853, Mar. 3, 2020, XP081613817.

* cited by examiner

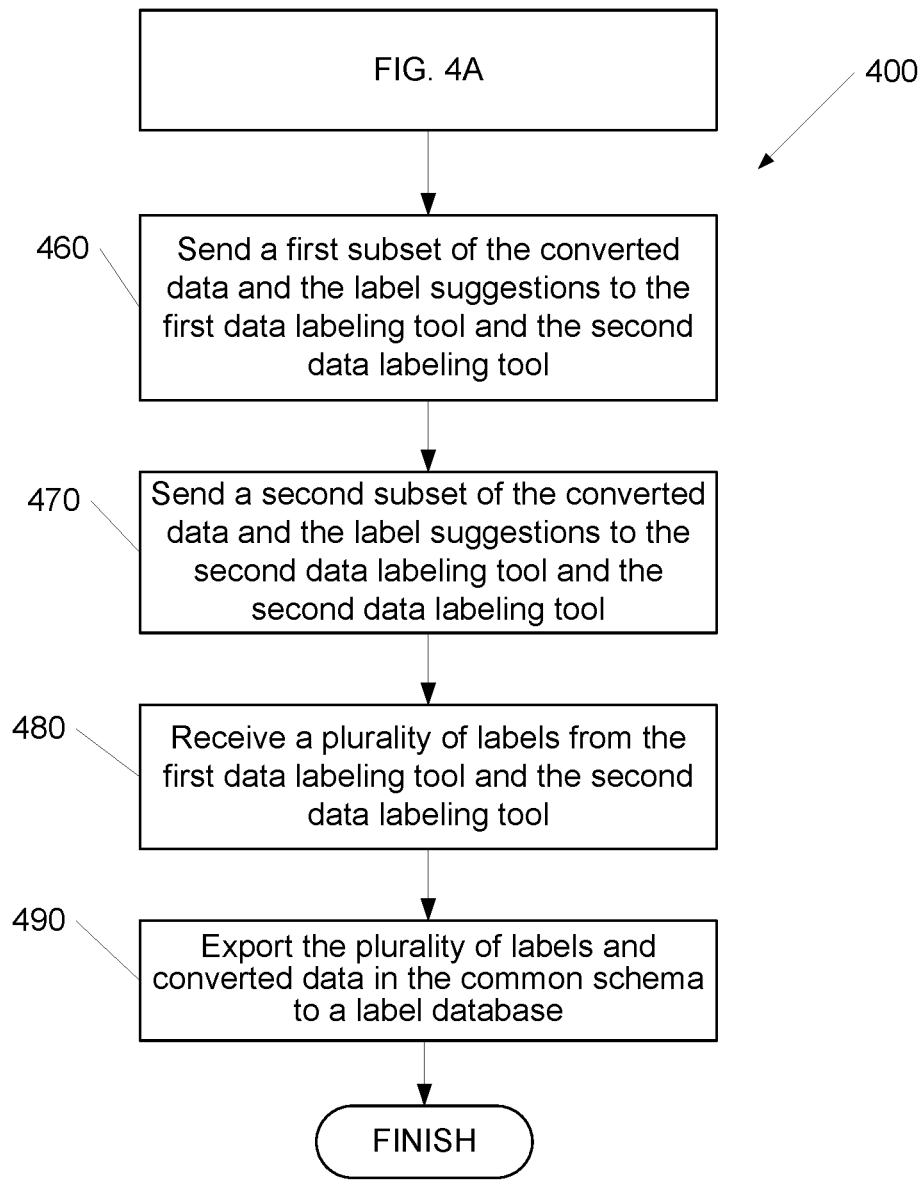

MULTIPLE DATA LABELING INTERFACES WITH A COMMON DATA INFRASTRUCTURE

FIELD OF USE

Aspects of the disclosure relate generally to big data, and more specifically to the privacy and labeling of big data.

BACKGROUND

In building, managing, and evaluating machine learning workflows, a massive amount of data may be collected and annotated (i.e., "labeled"). Data labeling may be a process to highlight certain data features, such as properties, characteristics, or classifications so that the collected data may be analyzed by the machine learning classifiers. Data labeling may be time consuming and resource draining in the machine learning pipeline, and various data labeling tools may need to support a wide range of labeling tasks. Each data labeling tool may have its own way to access data, store data, and output labels. These tasks may impose a greater challenge in certain industries that deal with confidential information. As a result, those industries might not be able to label data with efficiency and security. This may limit those industries' ability to use machine learning classifiers to provide predictions, insights and forecasts.

Aspects described herein may address these and other problems, and generally improve the quality, efficiency, speed, privacy and scalability of processing big data so that data originated from various data sources may be annotated with a common data infrastructure.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems as described herein may relate to providing multiple data labeling interfaces with a common data infrastructure. An annotation system may retrieve data from a plurality of data sources, and the data from the plurality of data sources may be in a plurality of different formats. The data from the plurality of data sources may be converted to a common schema. For example, the common schema may include a JavaScript Object Notation (JSON) format, a Comma-Separated Value (CSV) format, or an Extensible Markup Language (XML) format. The annotation system may train a machine learning classifier to output recommended label suggestions using training data comprising a set of predefined label suggestions. The converted data in the common schema may be provided as input to the trained machine learning classifier. A plurality of label suggestions may be received as output from the trained machine learning classifier. The annotation system may send a first subset of the converted data and the corresponding label suggestions associated with the first subset to the first data labeling tool. The annotation system may send a second subset of the converted data and the corresponding label suggestions associated with the second subset to the second data labeling tools. A plurality of labels associated with the first subset and the second subset may be received from the first data labeling tool and the second data labeling tool. The first data labeling tool and the second data labeling tool may be associated with different data formats. The annotation system may accordingly export the plurality of labels and the converted data in the common schema to a label database.

These features, along with many others, are discussed in greater detail below.

BRIEF DESCRIPTION OF THE DRAWINGS

The present disclosure is described by way of example and not limited in the accompanying figures in which like reference numerals indicate similar elements and in which:

FIGS. 4A-B show a flow chart of a process for providing multiple data labeling interfaces with a common data infrastructure according to one or more aspects of the disclosure.

DETAILED DESCRIPTION

Figure 1:
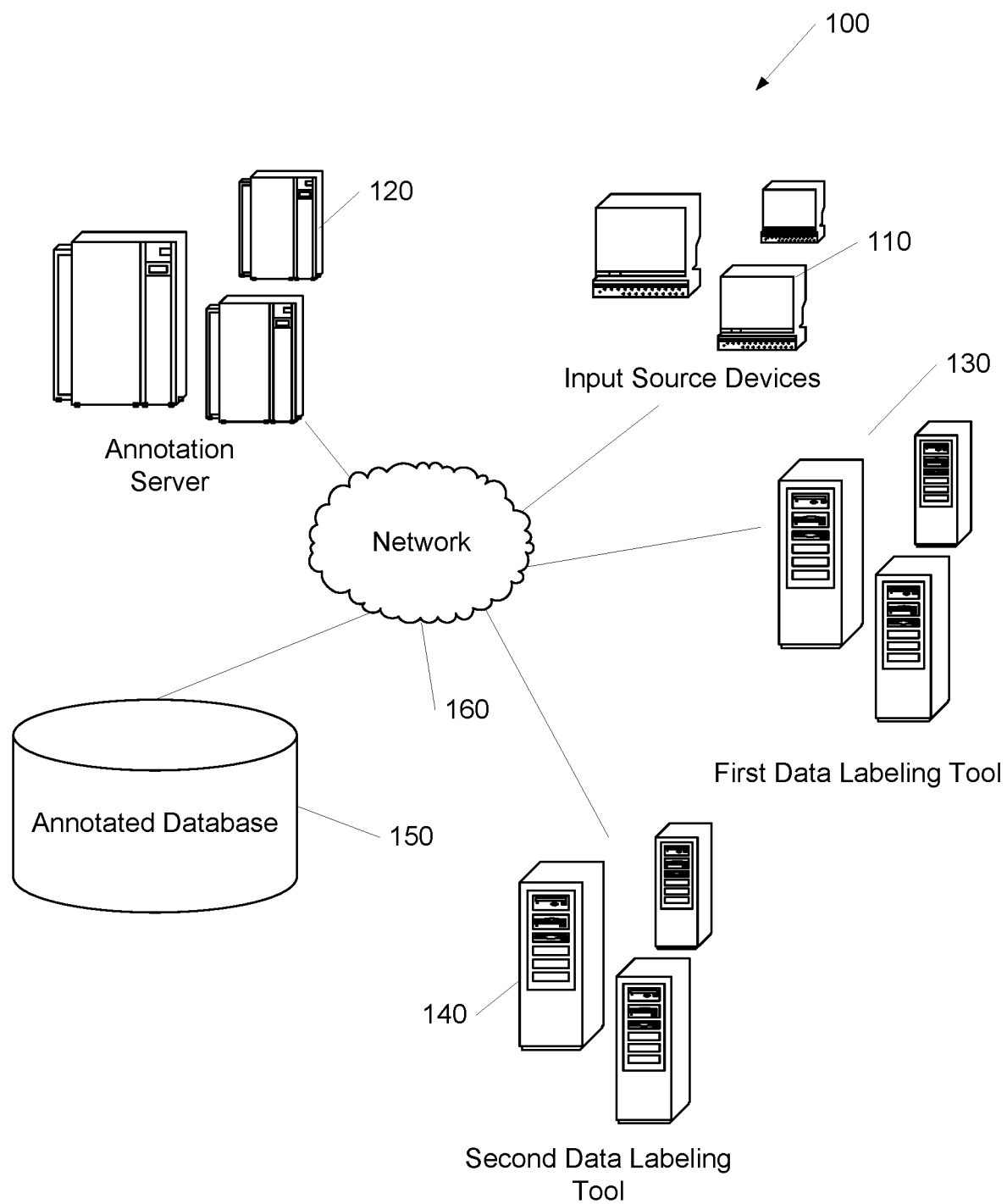
FIG. 1 shows an example of a system for providing multiple data labeling interfaces with a common data infrastructure in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for providing multiple data labeling interfaces with a common data infrastructure. Prior to sending the first subset of the converted data and the corresponding plurality of label suggestions associated with the first subset, an annotation system may convert the first subset of the converted data from the common schema to a first data format associated with the first data labeling tool. Prior to sending the second subset of the converted data and the corresponding plurality of label suggestions associated with the second subset, the annotation system may convert the second subset of the converted data from the common schema to a second data format associated with the second data labeling tool. The annotation system may store the converted data and the corresponding plurality of labels in the common schema in the label database.

In many aspects, the annotation system may initiate a session in a virtual environment hosting at least the first data labeling tool and the second data labeling tool. After receiving the plurality of labels associated with the first subset and the second subset, the annotation system may store, in a container of the virtual environment, the plurality of labels. The annotation system may export the plurality of labels to the label database. The annotation system may subsequently expunge the stored plurality of labels from the container and terminate the session in the virtual environment.

The annotation system as described herein allows for using the machine learning classifier to generate a plurality of label suggestions in a non-production environment. The annotation system may send the data and the plurality of label suggestions (e.g., those generated using the machine learning classifier) to the first data labeling tool and the second data labeling tool in a production environment. In some examples, the virtual environment may be associated with a production environment.

In many aspects, each of the plurality of label suggestions may correspond to a confidence score. The annotation system may train the machine learning classifier based on the confidence score. For example, the annotation system may determine a first set of label suggestions with corresponding confidence scores falling below a threshold value. The annotation system may regenerate, using the machine learning classifier, a second set of label suggestions. The second set of label suggestions may have confidence scores above the threshold value.

Aspects described herein improve the functioning of computers at least because the aspects described herein improve the way in which computing devices collect, process, and generate data. Indeed, as indicated above, the aspects described herein relate specifically to the computer-implemented labeling of data. The steps described herein could not be performed by a human or with pen and paper, at least because steps involving the machine learning classifier could not be performed by a human in the first place. The steps further initiate a session in a virtual environment executed in the computing devices, and terminate the session upon a completion of the labeling tasks, which are necessarily rooted in the computer technology. The steps also recite a combination of additional elements including converting data that was received by the annotation server in a non-standardized form to a standardized format, storing information in a container of the virtual environment and exporting labels in a permanent storage. The claim as a whole integrates the data collection and processing into a practical application. Specifically, these additional elements recite a specific improvement over prior art systems by allowing various data labeling tools to be used in a standardized format regardless of the format in which the data was input from the data sources.

Annotation Systems

FIG. 1 shows an annotation system 100. The annotation system 100 may include at least one input source device 110, at least one annotation server 120, at least one first data labeling tool 130, at least one second data labeling tool 140, and/or at least one annotated database 150 all interconnected via a network 160. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

Input source device 110 may be any device capable of obtaining data that contains a collection of text, images, audio, video or any other unstructured data, some of which may represent data to be labeled. For example, the collection of text may comprise personally identifiable information (PII). In some instances, the collection of text may be related to a transaction record containing confidential financial data. The collection of text may include conversation snippets from a chatbot related to a service provided by a financial institution. Input source devices 110 may include scanner, a camera, camera-arrays, camera-enabled mobile-devices, etc.

Alternatively, input source devices 110 may include computing devices, such as laptop computers, desktop computers, mobile devices, smart phones, tablets, and the like. According to some examples, input source devices 110 may include hardware and software that allow them to connect directly to network 160. Alternatively, input source devices 110 may connect to a local device, such as a personal computer, server, or other computing device, which connects to network 160. In some embodiments, input source devices 110 may include a scanner associated with an automated teller machine (ATM). The scanner may be configured to scan checks, certificates of deposit, money orders, and/or currency. In other embodiments, the input source 110 may be a scanner located at a branch location. The scanner may be configured to scan data, such as loan and/or credit applications, and securely transmit the data to a central location, such as a head office or a central banking location, for further processing.

Annotation server 120 may collect, parse, and/or store data to be labeled. Annotation server 120 may retrieve data from a plurality of data sources and in a plurality of different formats. Annotation server 120 may convert the data from the plurality of data sources to a common schema. For example, the data may be stored as unstructured data from various input sources which may include books, journals, metadata, health records, audio, video, analog data, images, files, and/or unstructured text, such as the body of an e-mail message, Web page, or word-processor document. For example, the annotation server 120 may extract content and/or data from a content website automatically using a bot or web scraper. Annotation server 120 may access the content website using a web protocol, such as Hypertext Transfer Protocol (HTTP), or through a web browser. Annotation server 120 may extract a text string from an input source that a user has sent through a chat application such as a chatbot. Annotation server 120 may obtain a data dump from the content sources and store the data in a corpus database (not shown in FIG. 1). The corpus database may also be part of annotated database 150. Annotation server 120 may copy or collect unstructured data in a text format from the web, convert the news data into a common schema, such as a JSON format, CSV format or XML format. For example, data in the text format may be included as a payload in the JSON, CSV or XML format. Image, audio or video data may be included a pointer in the JSON, CSV or XML format, pointing to a location where the data is stored. Annotation server 120 may store data in the corpus database for later retrieval or analysis.

Annotation server 120 may parse collections of text in the data to identify keywords and/or confidential data. Annotation server 120 may identify (and, e.g., filter) certain stop words from the text, such as "that," "the," "are," "to" and the like, to adjust for the fact that some words may appear more frequently, but carry less weight. Annotation server 120 may identify (and, e.g., filter) the stop words using, for example, term frequency-inverse document frequency (TFIDF), which may be a numerical statistic model that may reflect how important a word is to a document in a collection or corpus. Annotation server 120 may identify confidential data by processing the data to identify one or more portions of the data that may potentially relate to confidential information. For example, confidential data may comprise social security numbers, such that annotation server 120 may identify social security numbers in the data by scanning for numbers in a format that looks similar to a social security number. In another example, confidential data may include images of driver licenses, such that annotation server 120 may identify driver license numbers in the data by scanning for numbers in a format that looks similar to a valid driver license number and also located in a proximity to the images of the drivers.

Annotation server 120 may use training data comprising a set of predefined label suggestions to train a machine learning classifier to output recommended label suggestions. The recommended label suggestions may relate to any type of labeling of data. For example, the training data may include driver license images, and the predefined labels (e.g., "Real" or "Fake") may specify whether an image represents a driver license. As another example, the training data may include text from a news website, and the predefined labels (e.g., "Sports," "Politics") may indicate a topic of all or portions of the news website. Annotation server 120 may provide data, such as the image data to be labeled, as input to the trained machine learning classifier. The annotation server 120 may receive a plurality of label suggestions as output from the trained machine learning classifier.

Annotation server 120 may initiate a session in a virtual environment that hosts a first data labeling tool 130 and a second data labeling tool 140. The virtual environment may host a plurality of data labeling tools including first data labeling tool 130 and a second data labeling tool 140. Annotation server 120 may send the data to be labeled and the plurality of label suggestions generated by the trained machine learning classifier to first data labeling tool 130 and second data labeling tool 140. For example, annotation server 120 may send a first set of the data and the corresponding label suggestions associated with the first subset to first data labeling tool 130. Annotation server 120 may send a second set of the data and the corresponding label suggestions associated with the second subset to first data labeling tool 130. The first subset may be different from the second subset. Alternatively, the first subset may overlap with the second subset. Annotation server 120 may receive a plurality of labels associated with the data from first data labeling tool 130 and second data labeling tool 140. Annotation server 120 may store the plurality of labels in a container of the virtual environment. After receiving a request to terminate the session, annotation server 120 may export the plurality of labels to a label database, such as the annotated database 150.

First data labeling tool 130 and second data labeling tool 140 may execute on one or more computing devices which may be the same or similar as the input source devices 110, the annotation server 120, and/or the annotated database 150. Annotation server 120 may initiate a session in a virtual environment, and first data labeling tool 130 and second data labeling tool 140 may be hosted in this virtual environment. Annotation server 120 may implement a common schema to facilitate the communication with first data labeling tool 130 and second data labeling tool 140, including receiving and sending data and labels. The first data labeling tool 130 and the second data labeling tool 140 may be used by users such as data labelers and/or data validators to label data. Annotation system 100 may include more than two data labeling tools, in addition to first data labeling tool 130 and second data labeling tool 140. Different set of data may be suitable to be labeled via different data labeling tools. The labels generated by different data labeling tools may have different formats and internal structure. For example, the labels generated by first data labeling tool 130 may be in a first data format, and the labels generated by second data labeling tool 140 may be in a second data format. First data labeling tool 130 and second data labeling tool 140 may receive data to be labeled from input source devices 110 and may receive the plurality of label suggestions from annotation server 120. For example, annotation server 120 may convert a first subset of data from the common schema to the first data format and send the first subset of the converted data to first data labeling tool 130. Annotation server 120 may convert a second subset of data from the common schema to the second data format and send the second subset of converted data to second data labeling tool 140. In turn, first data labeling tool 130 and second data labeling tool 140 may send a plurality of labels associated with the data to annotation server 120.

Annotated database 150 may store data and label(s) corresponding to the data. For example, annotated database 150 may store transaction records related to transactions previously conducted by users in transaction streams from customers of a financial institution. A transaction record may be stored with a label, such as class 1 or class 0, where class 1 may correspond to non-fraudulent transactions and class 0 may correspond to fraudulent transactions. In another example, annotated database 150 may store chat messages between a customer of a financial institution and a customer service representative. For example, a record in annotated database 150 may include a record identifier, a customer identifier, a comment field related to feedback on a service provided by the financial institution, and a label such as a negative or positive to indicate the nature of the customer experience with the service.

Annotation server 120 may later retrieve the labeled data including confidential data and send to a computing device (not shown) to provide insights to the data to facilitate tasks related to, for example, an authentication process and/or decisioning process. For example, the computing device may be an authentication system, and an authentication decision may be based on the labeled data such that, for example, data labeled as fake or otherwise fraudulent may cause an authentication request to be denied. As another example, the computing device may be a server that processes applications for purchases, loans, or the like. Based on the labels indicating that data relating to a transaction is fraudulent or non-fraudulent, the computing device may approve or deny such applications.

Input source devices 110, annotation server 120, first data labeling tool 130, second data labeling tool 140, and/or annotated database 150 may be associated with a particular authentication session. Annotation server 120 may receive, process, and store a variety of data including confidential information, and/or receive data from input source devices 110 as described herein. However, it should be noted that any device in annotation system 100 may perform any of the processes and/or store any data as described herein. Some or all of the data described herein may be stored using one or more databases. Databases may include, but are not limited to relational databases, hierarchical databases, distributed databases, in-memory databases, flat file databases, XML databases, NoSQL databases, graph databases, and/or a combination thereof. The network 160 may include a local area network (LAN), a wide area network (WAN), a wireless telecommunications network, and/or any other communication network or combination thereof.

The data transferred to and from various computing devices in annotation system 100 may include secure and sensitive data, such as confidential data, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in annotation system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in annotation system 100 in front of one or more computing devices such that any external devices may communicate directly with the specialized hardware.

Computing Devices

Figure 2:
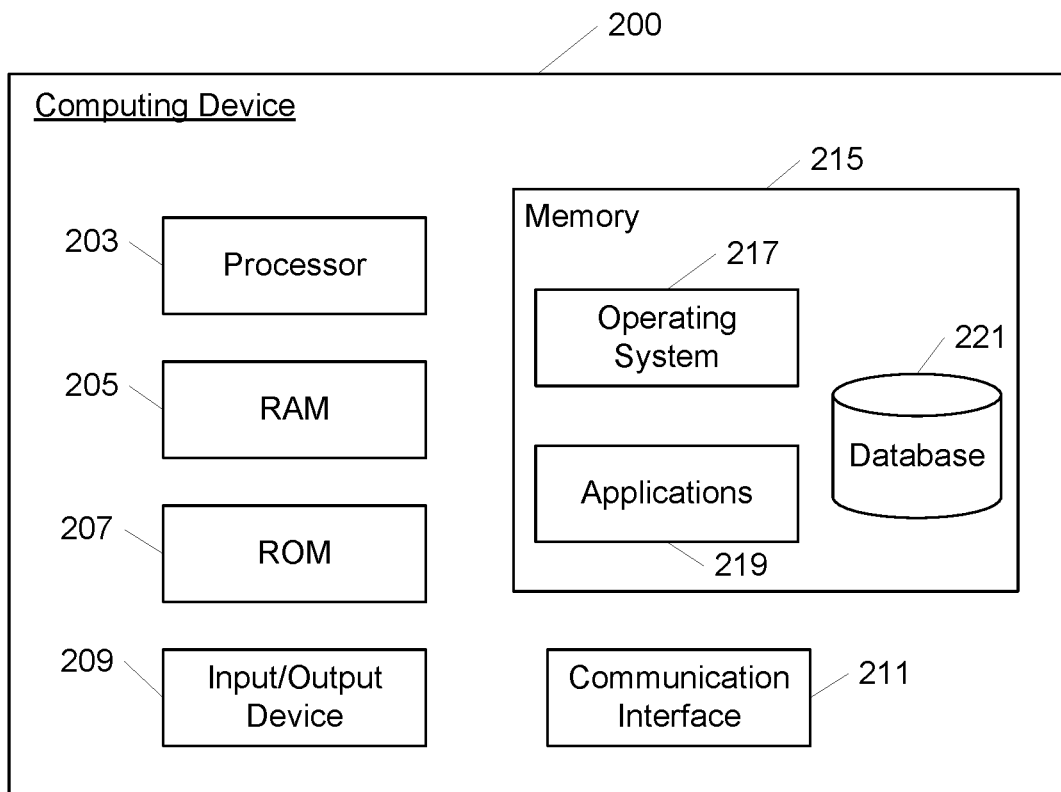
FIG. 2 shows an example computing device in accordance with one or more aspects described herein.

Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. Memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Deep Neural Network Architecture

Figure 3:
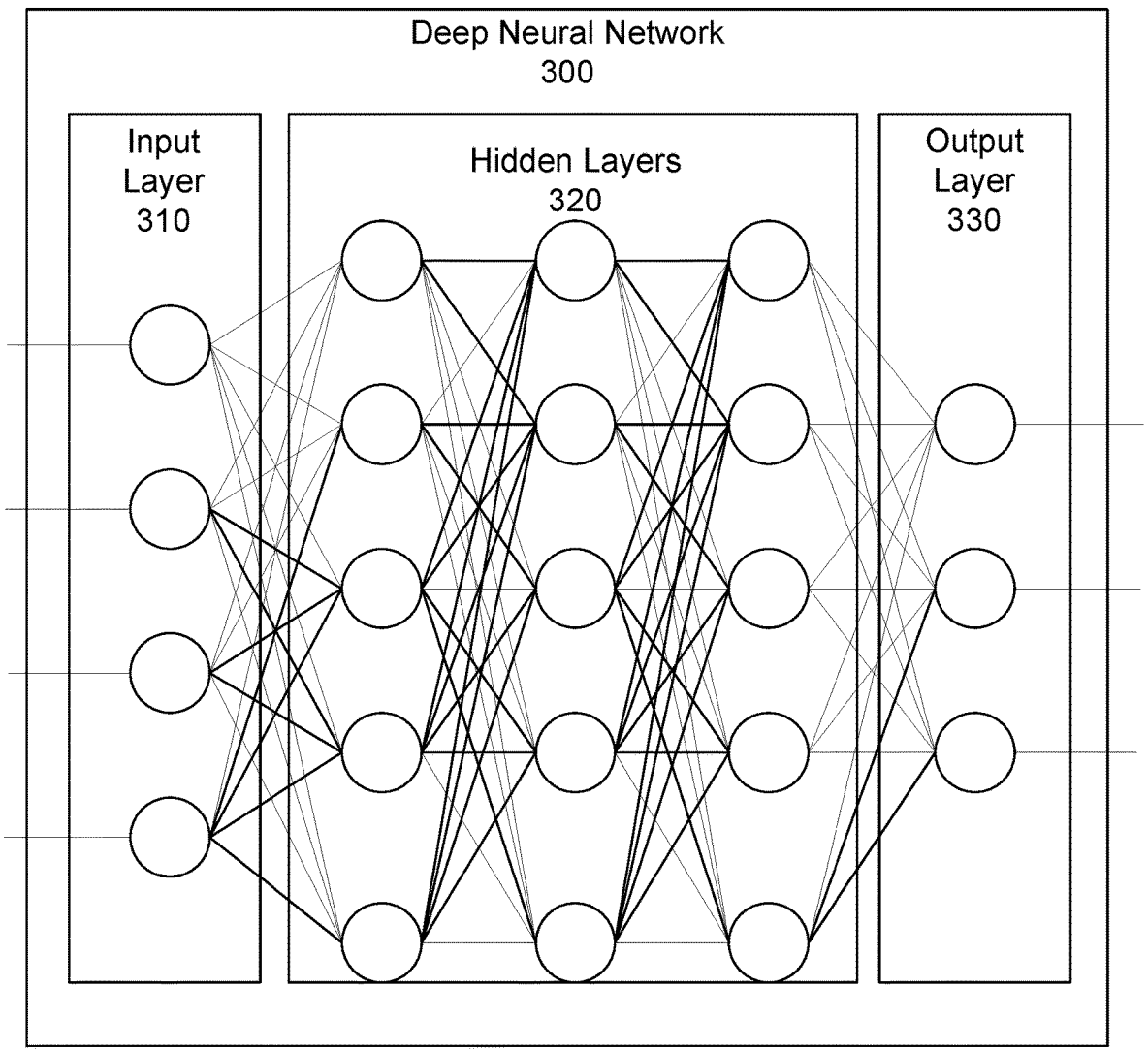
FIG. 3 depicts an example deep neural network architecture for a machine learning classifier according to one or more aspects of the disclosure.

FIG. 3 illustrates an example deep neural network architecture 300 for a machine learning classifier. Such a deep neural network architecture may be implemented by a computing device 200 shown in FIG. 2. That said, the architecture depicted in FIG. 3 need not be performed on a single computing device, and might be performed by, e.g., a plurality of computers. An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 310, one or more hidden layers 320, and an output layer 330. A deep neural network, as used herein, may be an artificial network that has more than one hidden layer. Illustrated network architecture 300 is depicted with three hidden layers, and thus may be considered a deep neural network. The number of hidden layers employed in deep neural network 300 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Providing Multiple Data Labeling Interfaces

As noted above, industries may acquire data comprising confidential information about users through data, which might be received via documents, forms, websites, chat applications, and the like. Such data may be labeled using various data labeling tools in different formats. The annotation system described herein may provide a virtual environment to host various data labeling tools. The virtual environment may be a production environment. The virtual environment may also be a non-production environment, such as that used for software development ("DEV"), quality assurance ("QA"), analytics, or other environments. The annotation system, such as annotation server 120, may implement a unified common schema in an integrated data labeling platform. Machine learning classifiers may be used to generate label suggestions for the data. The data may be labeled, for example, as part of the training data for the machine learning classifier or as part of the recognition performed by the machine learning classifier itself. The annotation system may convert the data and label suggestions to a format suitable for each individual data labeling tool. The data labeling tools may generate labels based on the label suggestions. In this regard, the annotation system may import data into the labeling tools and export labels from the labeling tools. Accordingly, the annotation system may enable an end-to-end secure and automated system that may leverage various labeling tools and have better control over sensitive data to be labeled.

Figure 4A:
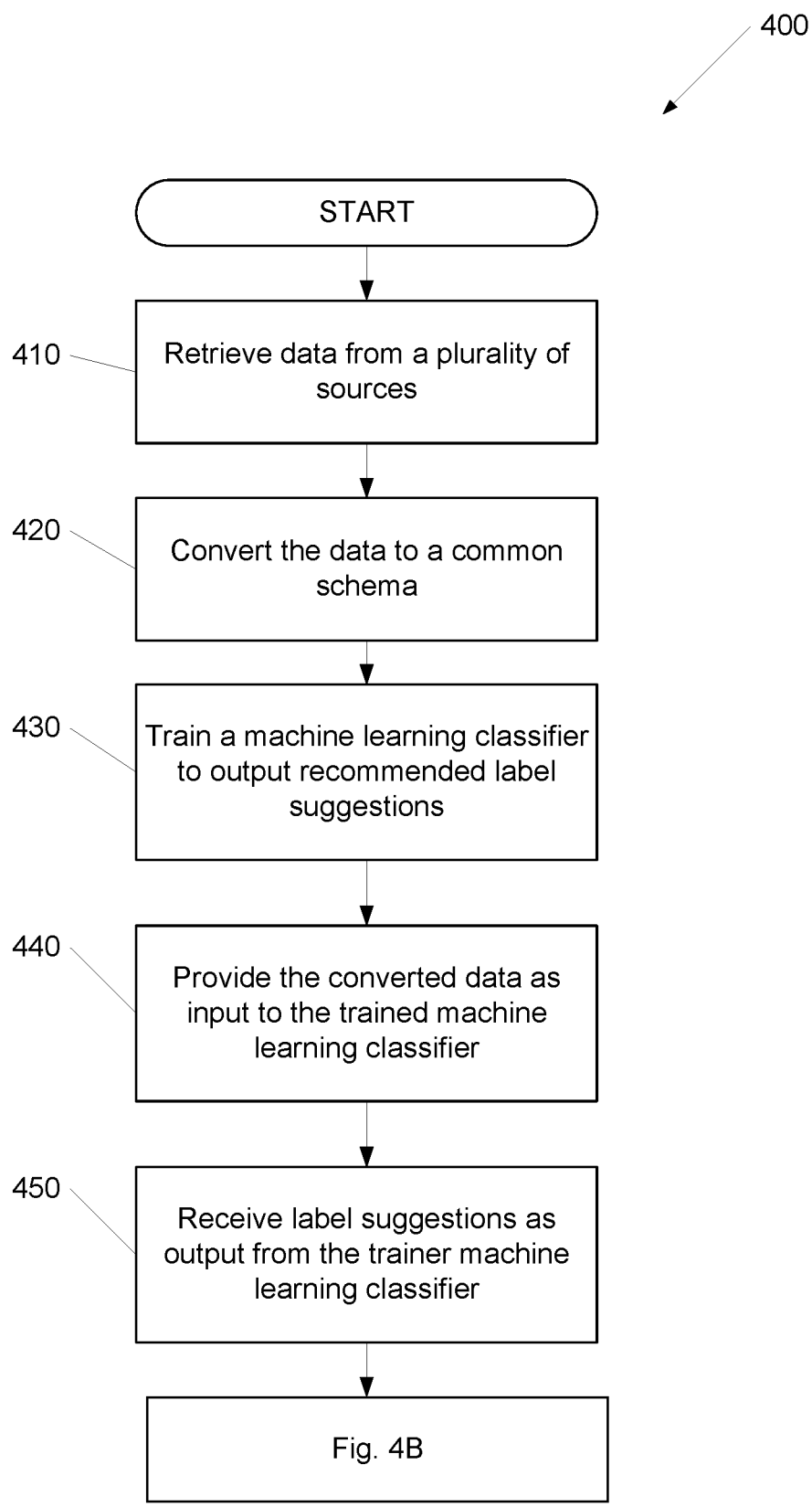

FIGS. 4A-4B show a flow chart of a process 400 for providing multiple data labeling interfaces with a common data structure according to one or more aspects of the disclosure. Some or all of the steps of process 400 may be performed using one or more computing devices as described herein. For example, a computing device may comprise one or more processors and memory storing instructions that, when executed by the one or more processors, cause the performance of one or more of the steps of FIGS. 4A-4B. One or more steps of process 400 may use one or more machine learning classifiers. Such machine learning classifiers may be implemented by deep neural network architecture 300 shown in FIG. 3. The machine learning classifiers may be implemented using other supervised, semi-supervised or unsupervised machine learning algorithms. As another example, one or more non-transitory computer-readable media may store instructions that, when executed by one or more processors of a computing device, cause the computing device to perform one or more of the steps of FIGS. 4A-4B. The steps depicted in FIGS. 4A-4B are illustrative, and may be rearranged, omitted, and/or modified as desired. For example, multiple steps may be performed between steps 410 and 420.

Starting with FIG. 4A, at step 410, an annotation server (e.g., annotation server 120) may retrieve data from a plurality of data sources. The data from the plurality of data sources may be in a plurality of different formats. The data may include, for example, a document comprising a collection of text which may represent a plurality of confidential data. For example, an annotation server may receive data related to customer feedback via a chatbot, and various aspects of the customer feedback may be labeled as positive or negative. In another example, the data may include transaction records related to previously conducted transactions that may be labeled either as fraudulent or non-fraudulent. The transaction records may provide insights to facilitate fraud detection logic. The transaction records may include confidential information such as a social security number, an account identifier, a transaction amount, a transaction time, transaction location, a channel of transaction (e.g. online or in physical store) and a merchant identifier. In still another example, the data may include images related to users' driver licenses, which may be labeled as real or fake. In a variety of embodiments, the data may be collected as a first data format such as a scanned image data format. The data may be collected as a second data format such as a text format. The data may be collected as a third data format such as a HTML format.

Data may be collected and processed in a production environment, such as a data stream, in real time. Data may be retrieved from one production environment to another production environment (e.g., the virtual environment executing the data labeling tools). Data may be collected and processed in a non-production environment. Data may be retrieved from one non-production environment to another production or non-production environment. Data may be processed in a batch process. For example, data containing confidential data may be collected periodically, and/or the data may be dumped periodically, such as once per 10 minutes, once per hour, or once per day. Data in the text format may be pre-processed via a random sampling to eliminate duplicated data. Data may be dumped after a verification of non-duplicated data to produce a light weight data payload.

The annotation server may retrieve data from various data sources and feed the data into the virtual environment. The data may be filtered and formatted into the common schema. The annotation server may use natural language processing (NLP) or optical character recognition (OCR) to parse the data and/or identify keywords. Annotation server may identify and remove certain stop words that do not add much meaning to the sentences, such as "and," "at," "the," "is," "which," etc. For example, an organization may implement an intelligence system, such as a chatbot, to interact with a customer related to inquiries about the services provided by the organization. The annotation server may process a text string a customer has texted or sent through a chat client. The text string may correspond to text messages between the customer and the chatbot. The annotation server may take individual snippet from the text messages, and each utterance in the conversation may each appear as a separate record in the data source. As part of creating the data labeling job, the conversation may be filtered to get the subset of the conversations the data labeler desires to label. For example, the annotation server may carve out certain customers and their conversations on certain days. The annotation server may combine the filtered conversation snippets into a single text string for further processing.

At step 420, the annotation server may convert the data from the plurality of data sources to a common schema, such as a JSON format, CSV format, or XML format. The annotation server may convert data from the first data format to the common schema. The annotation server may convert data to be labeled from the second data format to the common schema. The data may include text embeddings that are generated, for example, based on the collection of text. An embedding may be a compact representation of the original data. Annotation server may use language modeling and/or feature learning techniques in NLP where keywords or phrases from the collection of the text may be mapped to vectors of real numbers. For example, where data contains a comment comprising six sentences, the annotation server may convert each of the six sentences into a feature vector. A first feature may be generated based on keywords in the first sentence. Likewise, annotation server may convert the second sentence in the comment into a second feature vector. In another example, where data contains various transaction records, the data may include keywords related to a transaction, such as an account identifier, a transaction amount, a transaction time, transaction location, a channel of transaction (e.g. online or in physical store), a merchant identifier, a merchant code, etc. The annotation server may convert transaction-related information into text embeddings corresponding to one or more feature vectors. The one or more feature vectors may be based on the keywords related to the transaction.

The text embeddings or the images may be stored using the common schema. For example, data in the text format may be included as a payload in the JSON, CSV or XML format. Image, audio or video data may be included a pointer in the JSON, CSV or XML format, pointing to a location where the data is stored. In the example of the chatbot application, the annotation server may retrieve the conversation snippets from the data source and format the conversation snippets in the common format. The annotation server may pass the conversation snippets in the common schema to a machine learning classifier.

At step 430, the annotation server may train the machine learning classifier to output recommended label suggestions. The machine learning classifier may be trained using training data comprising a set of predefined label suggestions. For example, the training data may include text strings collected from the chatbot applications. Each text string may contain predefined label suggestions for different portions of the text string. A first portion may have the label suggestion related to a numbering image, the second portion may have the label suggestion related to a noun, the third portion may have the label suggestion related to a location, etc. The training data may be retrieved from the annotation database. For example, the pre-labeled training data may be based on previous conversations between customers and a chatbot, which may have been saved in the annotation database with the labels indicating different portions of the conversation snippets. Alternatively, an organization may monitor conversations generated by the chatbot in real time, and use the conversation snippets as training data, and label suggestions may be generated in a production environment. Still alternatively, the label suggestions on the training data may be generated in a non-production environment, but the label suggestions may be accessed by the production environment.

The machine learning classifier may output recommended label suggestions based on the pre-defined label suggestions. Each set of recommended label suggestions for a conversation snippet may be associated with a confidence score. For example, the machine learning classifier may output a first set of recommended label suggestions associated with a first confidence score. The machine learning classifier may output a second set of recommended label suggestions associated with a second confidence score. The second confidence score may be higher than the first confidence score. The machine learning classifier may be trained until it obtains a set of recommended label suggestions with the confidence score higher than a threshold value (e.g., 95%).

The training of the machine learning model may implement an active learning approach. For example, instead of using all training data, the annotation server may focus on a subset of data with recommended label suggestions that have low confidence scores, given this subset of data may provide more opportunity for the machine learning model to learn.

At step 440, the annotation server may provide the data to be labeled as input to the trained machine learning classifier. For example, the data provided to the trained machine learning classifier may include real time conversation snippets from the chatbot and the conversation snippets in a form of string texts may be fed into the trained machine learning classifier as the input.

At step 450, the annotation server may receive a plurality of label suggestions as output from the trained machine learning classifier. For example, the conversation snippet may contain five portions. The trained machine learning model may generate label suggestions L1-L5 as output based on the conversation snippets.

At step 460, the annotation server may send a first subset of the converted data and the corresponding label suggestions associated with the first subset to the first data labeling tool. At step 470, the annotation server may send a second subset of the converted data and the corresponding label suggestions associated with the second subset to the second data labeling tool. The annotation server may initiate a session in a virtual environment hosting at least the first data labeling tool and the second data labeling tool. The virtual environment may host various data labeling tools including the first data labeling tool and the second data labeling tool. The annotation server may create an interface for each data labeling tool, which may be suitable to label a subset of the data. The annotation server may select the data labeling tools automatically based on the type and volume of the data to be labeled. For example, the data labeling tool PRODIGY, made by Explosion of Berlin, Germany, may be used for natural language processing (NLP) and named-entity recognition. The data labeling tool LABELBOX, made by Labelbox, Inc of San Francisco, California, may be used to annotate images for object detection.

Figure 5A:
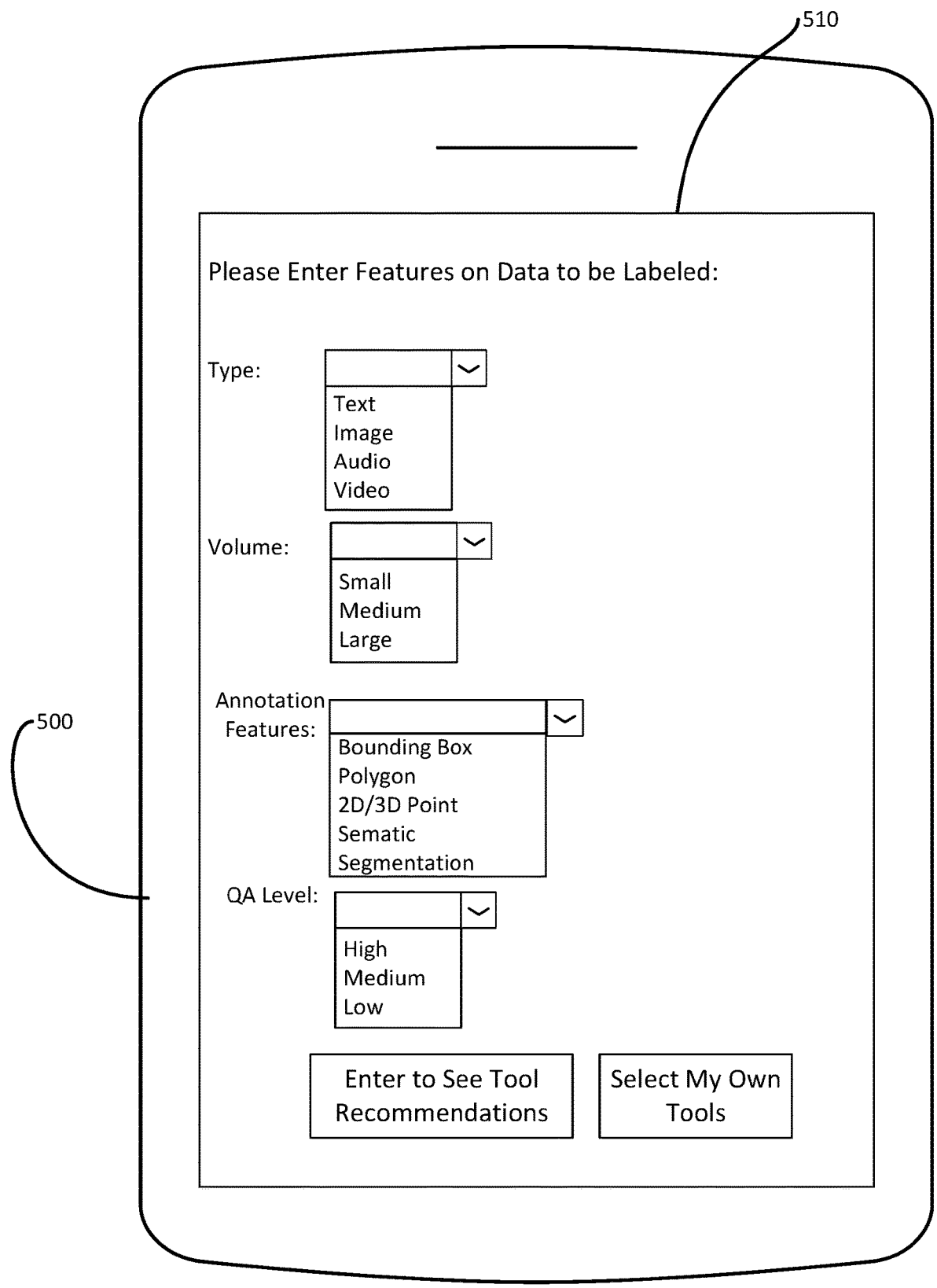
FIGS. 5A-B shows an interface for configure one or more data labeling tools in a virtual environment according to one or more aspects of the disclosure.

The annotation server may select the data labeling tools based on an input from a user, such as a data labeler. For example, the annotation server may present to the data labeler a configuration screen in FIG. 5A, which shows an interface for configure one or more data labeling tools according to one or more aspects of the disclosure. On a display screen of computing device 500, a user is prompted to enter features on the data to be labeled. For example, the user is asked to select the type (e.g., text, image, audio, video) of the data, the volume of the data, the annotation features, quality assurance (QA) capabilities. Other options (not shown in FIG. 5A) on supported file types, data security certifications, or storage options may also be provided to the user. For example, the annotation features may include bounding boxes, polygon, 2-D and 3-D point, semantic segmentation, etc. The data labeling tools may provide different levels of QA capabilities (e.g., high, medium, low). For example, optical character recognition (OCR) software may have an error rate of 97% to 99% per character. On a page with 1,800 characters, such a setting may result in around 9-54 errors. For a 300-page book, such a setting may result in around 5,400-16,200 errors. As such, it may be desirable to select an error rate based on, for example, the size of data involved, the importance of the data, and the like.

Figure 5B:
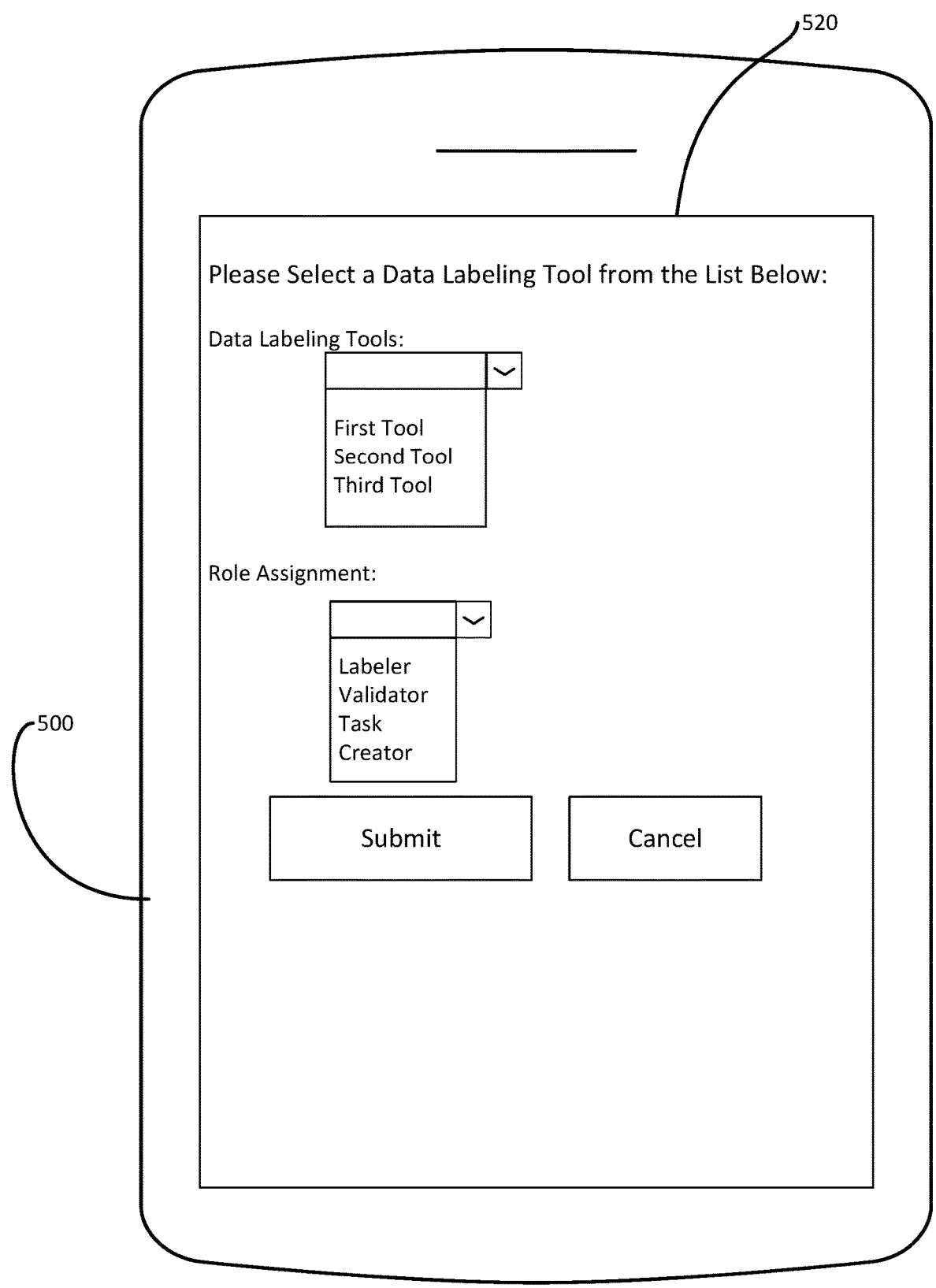

Based on the volume of the data and the type of the software, a data labeling tool may be selected with the appropriate QA level. The user may choose to enter these features to see recommended data labeling tools based on the data features. Alternatively, the user may choose to select the user's own data labeling tools in FIG. 5B. In the display 520 of FIG. 5B, a user is prompted to select a data labeling tool from a list that includes the first, second and third tools. For example, the first tool may be Prodigy, the second tool may be LABELBOX and the third tool may be TAGTOG, made by Tagtog of Gdansk, Poland. An administrator may also assign a role to the data labeler. For example, the labeler may be a regular data labeler, which may have access to conversations in a chatbot application, but not sensitive data such as driver license images. The labeler may be a validator, which may have access to more sensitive information such as images of driver licenses. The labeler may also be a task creator which may manage the workflow of the tasks created for multiple labelers in the virtual environment, and may send a request to terminate a session when multiple tasks have been completed in the virtual environment.

The converted data in the common schema may include different subsets of data suitable for different data labeling tools. For example, the annotation server may convert a first subset of converted data and the corresponding label suggestions associated with the first subset from the common format to a first format. The annotation server may convert a second subset of data and the corresponding label suggestions associated with the second subset from the common format to a second format. The annotation server may send the first subset of data and the corresponding label suggestions to the first data labeling tool. The annotation server may send the second subset of data and the corresponding label suggestions to the second data labeling tool.

The annotation server may create a framework that may spin up each data labeling tool individually within the framework. The annotation server may allow for a user to have Single Sign On (SSO) interaction with the data labeling tools. The annotation server may configure a labeling task and assign the labeling task to a specific data labeling tool.

In some example, the virtual environment may be implemented in a production environment. The data label tools may be executed in the production environment to label data in real time. For example, the data labeling tools executed in the virtual environment may process and label transaction records arriving in transaction streams from customers of an organization. In another example, the data labeling tools executed in the virtual environment may process and label chat messages in a chat application between a customer and a customer service representative. In some example, the virtual environment may be implemented in a non-production environment. The data label tools may be executed in the non-production environment to label analytical data.

At step 480, the annotation server may receive a plurality of labels associated with the first subset of the data and the second subset of the data from the first data labeling tool and the second data labeling tool, respectively. For example, a first set of labels generated by the first data labeling tool may be in a first format. A second set of labels generated by the second data labeling tool may be in a second data format. The annotation server may convert the first format and the second format to the common schema.

Some data labelers may use different data labeling tools to generate different labels for the same data. Other data labelers may use a same data labeling tool to generate different labels for the same data. The labels may have different structures based on the data labeler, the data labeling tools and the data. The data labeling tools may generate multiple labels for the same data. A voting mechanism may be used to select the appropriate labels for the data. For example, the conversation snippets may be labeled by three labelers using different data labeling tools. In that example, two labelers may label a snippet as L1, and one labeler may label it as L2. The annotation server may assign the label L1 to the snippet as the official label based on the majority label. Alternatively, the annotation server may select a label that is most recently labeled by a labeler. Still alternatively, the annotation server may give preference to the label generated by a data validator rather than a regular labeler. Other methods to select one or more labels from multiple labels generated for the same data may be possible.

The annotation server may communicate with the data labeling tools via API calls. The annotation server may send the data and label suggests to the data labeling tools, and receive the labels from the data labeling tools via API calls. As such, the interactions between the annotation server and various data labeling tools may be automated.

At step 490, the annotation server may export, to a label database, the plurality of labels and the converted data in the common schema. The annotation server may initially store the plurality of labels in a container of the virtual environment. The annotation server may spin up the container and point the container to a storage. The annotation server may save the data and the labels in the container and access the data and the labelers from the container. The data container may be agnostic to the data labeling tools, such that it might store labels for a variety of different data labeling tools. Some data labeling tools may expect to store the labels in a local storage and some data labeling tools may expect to store the labels in a remote storage. The data container may support both situations in the virtual environment. The annotation server may store sensitive data in a secured container in the virtual environment, which may limit the access to the secured container to certain user roles such as data validators.

After receiving a request to terminate the session, the annotation server may export the plurality of labels to a label database such as annotation database 150. After the data labelers have completed a batch of data to be labeled, the annotation server may export the labels from the data container to a more permanent storage, such as the label or annotation database. The annotation server may terminate the session associated with the data labelers in the virtual environment.

The techniques described herein may be used to creating a virtual environment in a production setting to execute multiple data labeling tools. A machine learning classifier may provide label suggestions to the data labeling tools. The data labels generated by each data labeling tool may be stored in a container which may provide increased security for sensitive data. As such, the virtual environment may implement multiple interfaces with a common data schema to automate various labeling tasks using different data labeling tools.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
    retrieving, by a server system, data from a plurality of data sources, wherein the data from the plurality of data sources is in a plurality of different formats;
    converting the data from the plurality of data sources to a common schema;
    training, using training data comprising a set of predefined label suggestions, a machine learning classifier to output recommended label suggestions;
    providing, as input to the trained machine learning classifier, the converted data in the common schema;
    receiving, as output from the trained machine learning classifier, a plurality of label suggestions associated with the converted data;
    initiating, by the server system, a session in a virtual environment hosting a first data labeling tool and a second data labeling tool for real time data labeling;
    sending, to the first data labeling tool, a first subset of the converted data and the corresponding label suggestions associated with the first subset;
    sending, to the second data labeling tools, a second subset of the converted data and the corresponding label suggestions associated with the second subset, wherein the first data labeling tool and the second data labeling tool are selected based on different data volumes associated with the first subset and the second subset of the converted data;
    receiving, from the first data labeling tool and the second data labeling tool, a plurality of labels associated with the first subset and the second subset, wherein the first data labeling tool and the second data labeling tool are associated with different data formats;
    exporting, to a label database, the plurality of labels and the converted data in the common schema; and
    after exporting the plurality of labels, terminating the session in the virtual environment.

2. The computer-implemented method of claim 1, further comprising:
    prior to sending the first subset of the converted data and the corresponding plurality of label suggestions, converting the first subset of the converted data from the common schema to a first data format associated with the first data labeling tool.

3. The computer-implemented method of claim 1, further comprising:
    prior to sending the second subset of the converted data and the corresponding plurality of label suggestions, converting the second subset of the converted data from the common schema to a second data format associated with the second data labeling tool.

4. The computer-implemented method of claim 1, further comprising:
    after receiving the plurality of labels associated with the first subset and the second subset, storing, in a container of the virtual environment, the plurality of labels.

5. The computer-implemented method of claim 4, further comprising:
    after exporting the plurality of labels, expunging the stored plurality of labels from the container.

6. The computer-implemented method of claim 1, wherein each of the plurality of label suggestions corresponds to a confidence score, and wherein training the machine learning classifier comprises:
    determining a first set of label suggestions with corresponding confidence scores falling below a threshold value; and
    regenerating, using the machine learning classifier, a second set of label suggestions, wherein the second set of label suggestions having confidence scores above the threshold value.

7. The computer-implemented method of claim 1, wherein using the machine learning classifier to generate the plurality of label suggestions comprises:

using the machine learning classifier to generate the plurality of label suggestions in a non-production environment; and
wherein sending the data and the plurality of label suggestions comprises:
sending the data and the plurality of label suggestions to the first data labeling tool and the second data labeling tool in a production environment.

8. The computer-implemented method of claim 1, wherein the first data labeling tool and the second data labeling tool are executed in a production environment.

9. The computer-implemented method of claim 1, wherein the common schema comprises a JSON format, a CSV format or an XML format.

10. An apparatus, comprising:
one or more processors; and
memory storing instructions that, when executed by the one or more processors, cause the apparatus to:
retrieve data from a plurality of data sources, wherein the data from the plurality of data sources is in a plurality of different formats;
converting the data from the plurality of data sources to a common schema;
train, using training data comprising a set of predefined label suggestions, a machine learning classifier to output recommended label suggestions;
provide, as input to the trained machine learning classifier, the converted data in the common schema;
receive, as output from the trained machine learning classifier, a plurality of label suggestions associated with the converted data;
initiate a session in a virtual environment hosting a first data labeling tool and a second data labeling tool for real time data labeling;
send, to the first data labeling tool, a first subset of the converted data and the corresponding label suggestions associated with the first subset;
send, to the second data labeling tools, a second subset of the converted data and the corresponding label suggestions associated with the second subset, wherein the first data labeling tool and the second data labeling tool are selected based on different data volumes associated with the first subset and the second subset of the converted data;
receive, from the first data labeling tool and the second data labeling tool, a plurality of labels associated with the first subset and the second subset, wherein the first data labeling tool and the second data labeling tool are associated with different data formats;
export, to a label database, the plurality of labels and the converted data in the common schema; and
after exporting the plurality of labels, terminate the session in the virtual environment.

11. The apparatus of claim 10, wherein the instructions, when executed by the one or more processors, cause the apparatus to:
prior to sending the first subset of the converted data and the corresponding plurality of label suggestions, convert the first subset of the converted data from the common schema to a first data format associated with the first data labeling tool.

12. The apparatus of claim 10, wherein the instructions, when executed by the one or more processors, cause the apparatus to:
prior to sending the second subset of the converted data and the corresponding plurality of label suggestions, convert the second subset of the converted data from the common schema to a second data format associated with the second data labeling tool.

13. The apparatus of claim 10, wherein the instructions, when executed by the one or more processors, cause the apparatus to:
after receiving the plurality of labels associated with the first subset and the second subset, store, in a container of the virtual environment, the plurality of labels.

14. The apparatus of claim 13, wherein the instructions, when executed by the one or more processors, cause the apparatus to:
after exporting the plurality of labels, expunge the stored plurality of labels from the container.

15. The apparatus of claim 10, wherein each of the plurality of label suggestions corresponds to a confidence score, and wherein the instructions, when executed by the one or more processors, cause the apparatus to:
determine a first set of label suggestions with corresponding confidence scores falling below a threshold value; and
regenerate, using the machine learning classifier, a second set of label suggestions, wherein the second set of label suggestions having confidence scores above the threshold value.

16. The apparatus of claim 10, wherein the common schema comprises a JSON format, a CSV format or an XML format.

17. A non-transitory machine-readable medium storing instructions that, when executed by one or more processors, cause the one or more processors to perform steps comprising:
retrieving data from a plurality of data sources, wherein the data from the plurality of data sources is in a plurality of different formats;
converting the data from the plurality of data sources to a common schema;
training, using training data comprising a set of predefined label suggestions, a machine learning classifier to output recommended label suggestions;
providing, as input to the trained machine learning classifier, the converted data in the common schema;
receiving, as output from the trained machine learning classifier and based on the converted data, a plurality of label suggestions associated with the converted data;
initiating a session in a virtual environment hosting a first data labeling tool and a second data labeling tool for real time data labeling;
sending, to the first data labeling tool, a first subset of the converted data and the corresponding label suggestions associated with the first subset;
sending, to the second data labeling tools, a second subset of the converted data and the corresponding label suggestions associated with the second subset, wherein the first data labeling tool and the second data labeling tool are selected based on different data volumes associated with the first subset and the second subset of the converted data;
receiving, from the first data labeling tool and the second data labeling tool, a plurality of labels associated with the first subset and the second subset, wherein the first data labeling tool and the second data labeling tool are associated with different data formats;
exporting, to a label database, the plurality of labels and the converted data in the common schema; and
after exporting the plurality of labels, terminating the session in the virtual environment.

18. The non-transitory machine-readable medium of claim 17, wherein
the instructions, when executed by the one or more processors, cause the one or more processors to perform steps comprising:
after receiving the plurality of labels associated with the first subset and the second subset, storing, in a container of the virtual environment, the plurality of labels.

19. The non-transitory machine-readable medium of claim 18, wherein
the instructions, when executed by the one or more processors, cause the one or more processors to perform steps comprising:
after exporting the plurality of labels, expunging the stored plurality of labels from the container.

20. The non-transitory machine-readable medium of claim 17, wherein the common schema comprises a JSON format, a CSV format or an XML format.

* * * * *